US007171197B2

(12) United States Patent
Miller et al.

(10) Patent No.: US 7,171,197 B2
(45) Date of Patent: *Jan. 30, 2007

(54) MOBILE WIRELESS LOCAL AREA NETWORK AND RELATED METHODS

(75) Inventors: Dean C Miller, San Clemente, CA (US); James E Handy, Huntington Beach, CA (US); Gordon E Letney, Auburn, WA (US); Kevin E Norby, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/105,333

(22) Filed: Apr. 13, 2005

(65) Prior Publication Data

US 2005/0181723 A1 Aug. 18, 2005

Related U.S. Application Data

(63) Continuation of application No. 09/878,674, filed on Jun. 11, 2002, now Pat. No. 6,990,338.

(51) Int. Cl.
H04Q 7/20 (2006.01)
(52) U.S. Cl. .................. 455/431; 455/432.1; 455/427; 370/316; 370/310
(58) Field of Classification Search ................ 455/431, 455/432.1, 427; 370/316, 310
See application file for complete search history.

(56) References Cited

U.S. PATENT DOCUMENTS

| 4,392,139 | A | 7/1983 | Aoyama et al. |
|---|---|---|---|
| 4,706,198 | A | 11/1987 | Thurman |
| 4,752,503 | A | 6/1988 | Thebault |
| 4,772,495 | A | 9/1988 | Headrick et al. |
| 4,832,288 | A | 5/1989 | Kendall et al. |
| 4,837,250 | A | 6/1989 | Headrick et al. |
| 4,866,515 | A | 9/1989 | Tagawa et al. |
| 4,866,524 | A | 9/1989 | Six |
| 4,958,381 | A | 9/1990 | Toyoshima |

(Continued)

FOREIGN PATENT DOCUMENTS

EP 0 917 316 A2 5/1999

(Continued)

OTHER PUBLICATIONS

Publication—IP Services over Bluetooth: Leading the Way to a New Mobility dated Oct. 18, 1999, Markus Albrecht et al., 10 pages.

*Primary Examiner*—Danh Cong Le
(74) *Attorney, Agent, or Firm*—Harness Dickey & Pierce P.L.C.

(57) ABSTRACT

A wireless local area network adapted for use by users traveling on a mobile platform such as an aircraft. The network includes a network server located on the mobile platform, and at least one network access point connected to the server and accessible wirelessly by at least one user portable electronic device over one of a plurality of non-overlapping network frequency channels. The RF characteristics of this wireless network are specifically tailored to meet applicable standards for electromagnetic compatibility with aircraft systems and RF exposure levels for passengers and flight crews.

18 Claims, 3 Drawing Sheets

U.S. PATENT DOCUMENTS

| | | |
|---|---|---|
| 5,450,617 A | 9/1995 | Moore .................. 455/71 |
| 5,670,742 A | 9/1997 | Jones |
| 5,808,661 A | 9/1998 | Infiesto et al. |
| 5,835,127 A | 11/1998 | Booth et al. |
| 5,880,867 A | 3/1999 | Ronald |
| 5,923,743 A | 7/1999 | Sklar |
| 5,924,030 A | 7/1999 | Rautiola et al. |
| 5,929,895 A | 7/1999 | Berry et al. |
| 5,990,928 A | 11/1999 | Sklar et al. |
| 5,991,138 A | 11/1999 | Sklar et al. |
| 5,995,833 A | 11/1999 | Zicker .................. 455/430 |
| 6,047,165 A | 4/2000 | Wright et al. .......... 455/66.1 |
| 6,243,585 B1 | 6/2001 | Pelech et al. |
| 6,249,913 B1 | 6/2001 | Galipeau et al. |
| 6,477,152 B1 | 11/2002 | Hiett |
| 6,544,174 B2 | 4/2003 | West et al. ............. 600/300 |
| 6,788,935 B1 * | 9/2004 | McKenna et al. ....... 455/431 |
| 6,876,642 B1 * | 4/2005 | Adams et al. .......... 370/338 |
| 6,931,247 B2 * | 8/2005 | Cox et al. ............. 455/431 |
| 6,985,750 B1 * | 1/2006 | Vicknair et al. ........ 455/519 |
| 7,020,708 B2 * | 3/2006 | Nelson et al. .......... 709/230 |
| 2002/0067711 A1 | 6/2002 | Kobayashi |
| 2002/0160773 A1 | 10/2002 | Gresham et al. |

FOREIGN PATENT DOCUMENTS

| | | |
|---|---|---|
| EP | 1 096 699 | 5/2001 |
| EP | 1 209 928 | 5/2002 |
| WO | WO 96/31021 | 10/1996 |
| WO | WO 00/64106 | 4/2000 |
| WO | WO 01/97433 | 12/2001 |

* cited by examiner

MOBILE WIRELESS LOCAL AREA NETWORK AND RELATED METHODS

CROSS-REFERENCE TO RELATED APPLICATIONS

This application is a continuation of U.S. patent application Ser. No. 09/878,674 filed on Jun. 11, 2002 now U.S. Pat. No. 6,990,338. The disclosure of the above application is incorporated herein by reference.

FIELD OF THE INVENTION

The present invention relates generally to communication systems on board mobile platforms such as aircraft and, more particularly, to an on-board wireless local area network (WLAN) accessible by passengers' portable electronic devices such as laptop computers.

BACKGROUND OF THE INVENTION

Mobile network systems have traditionally been limited in bandwidth and link capacity, making it prohibitively expensive and/or unacceptably slow to distribute broadband data and video services to all passengers on a mobile platform such as an aircraft, boat or train. There is great interest in making such services available to users on mobile platforms. A system for supplying television and data services to mobile platforms is described in co-pending U.S. patent application Ser. No. 09/639,912, the entire disclosure of which is incorporated herein.

The system described in application Ser. No. 09/639,912 provides bi-directional data transfer via satellite communications link between a ground-based control segment and a mobile RF transceiver system carried on each mobile platform. Each user on each mobile platform is able to interface with an on-board server by using a laptop, personal digital assistant (PDA) seat-back-mounted computer/display or other computing device. Each user can independently request and obtain Internet access, company intranet access, stored video and audio programming and live television programming.

It would be desirable to provide passengers with wireless connections to network services available on mobile platforms such as aircraft. There are concerns, however, about the possibility of interference to aircraft systems from portable electronic devices (PEDs) that might be used by passengers to make wireless connections to an on-board network. Of particular concern is the possibility of PED interference during critical phases of flight, for example, during takeoff and landing. There also are concerns that such networks might expose passengers and flight crews to radiated RF fields exceeding recommended health and safety limits for RF exposure.

Generally there are two types of PEDs: (1) intentional transmitters, which must transmit a signal in order to accomplish their function (e.g. cell phones, two-way radios, pagers and remote-control devices), and (2) non-intentional transmitters, which do not need to transmit a signal to accomplish their function, but nevertheless emit some level of radiation (e.g. laptop computers, compact disk players, tape recorders and electronic hand-held games). The Federal Aviation Administration (FAA) has not issued certification regulations for PEDs. The FAA does, however, restrict the use of PEDs on commercial airlines. FAA advisory circular AC91.21-1 paragraph 6.a (7) states that, unless otherwise authorized, use of PEDs classified as intentional transmitters should be prohibited during aircraft operation. General Operating and Flight Rules, 14 CFR 91.21(b)(5) ("Portable Electronic Devices") prohibits the operation of a PED on an aircraft, unless the aircraft operator has determined that the device will not cause interference with the navigation or communication systems on board the aircraft. Thus it is desirable to provide a wireless network that can be determined to be accessible by passenger-operated PEDs without causing such interference and thus could be authorized for on-board use. It also is desirable to provide an on-board wireless network that produces RF emission levels within recommended health and safety limits.

SUMMARY OF THE INVENTION

In one preferred form, the present invention provides a wireless local area network adapted for use by users traveling on a mobile platform such as an aircraft. The network includes a network server located on the mobile platform, and at least one network access point connected to the server and accessible wirelessly by at least one user portable electronic device over one of a plurality of non-overlapping network frequency channels. This wireless local area network can provide two-way communication, data and entertainment for aircraft passengers, cabin crews and flight crews. Such information may be obtained via e-mail, internet, company intranet access, and/or from data stored on board or off board the aircraft. The RF characteristics of this wireless network are specifically tailored to meet applicable standards for electromagnetic compatibility with aircraft systems and RF exposure levels for passengers and flight crews.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. As described below, the present invention in one embodiment is directed to a wireless LAN ("WLAN") for use in a mobile platform. The mobile platform could include an aircraft, cruise ship or any other mobile vehicle. Thus the reference to the mobile platform as an aircraft throughout the following description should not be construed as limiting the applicability of the WLAN 10 and/or the present invention to only aircraft.

Figure 1:
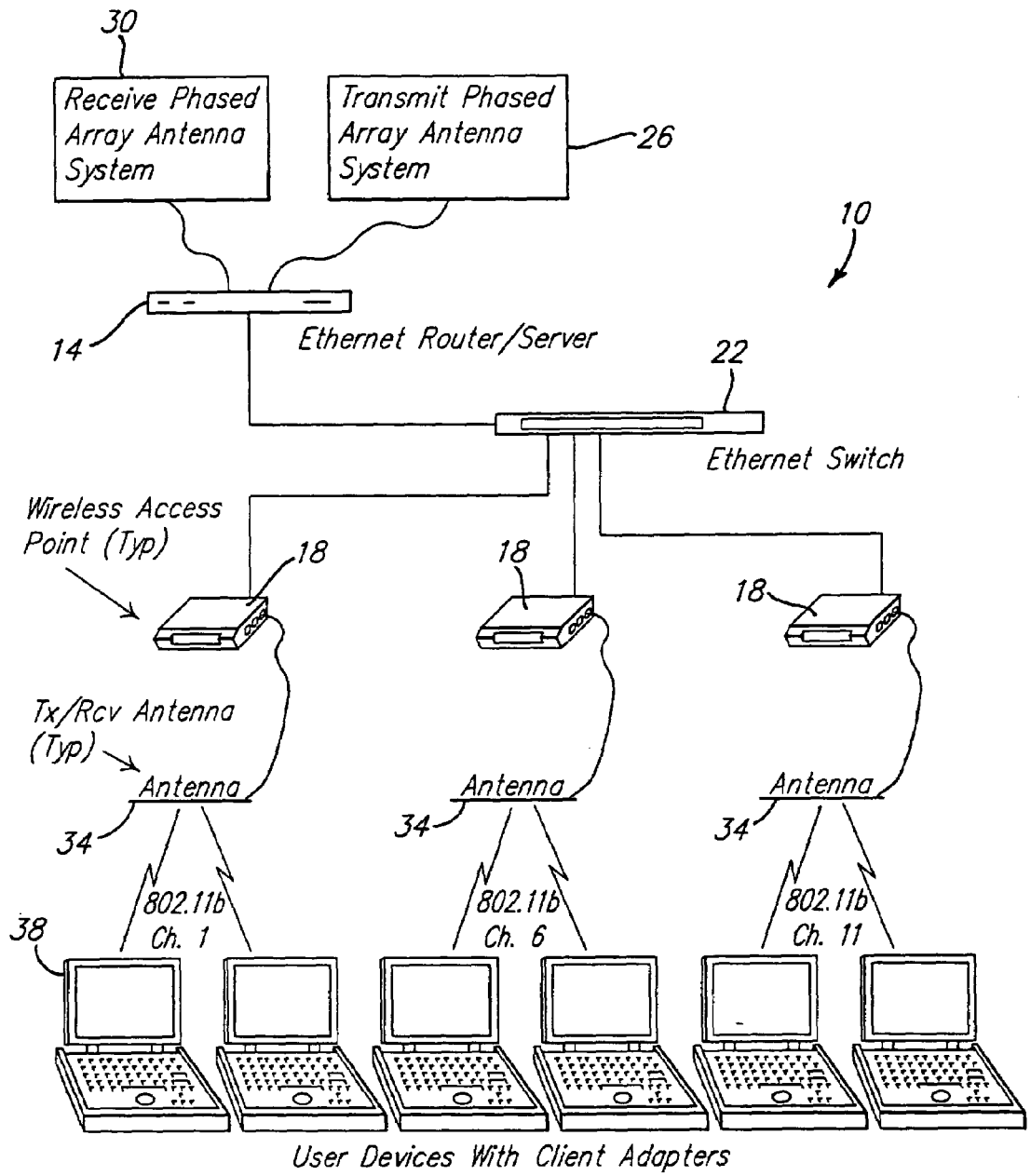
FIG. 1 is a view of a wireless LAN ("WLAN") adapted for use in a mobile platform such as an aircraft.

A preferred embodiment of a wireless LAN for use in a mobile platform such as an aircraft is indicated generally by the reference numeral 10 in FIG. 1. The WLAN 10 includes an Ethernet router/server 14 (hereinafter "server") wired to a plurality of access points 18 via at least one switching device such as an Ethernet switch 22. In the embodiment shown in FIG. 1, the server 14 is connected to a transmit antenna, in this example, a transmit phased array antenna system 26, and to a receive antenna, which in this example comprises a receive phased array antenna system 30. The antenna systems 26 and 30 provide for two-way communication via satellite link between the WLAN 10 and a ground based network segment, as described in co-pending U.S. patent application Ser. No. 09/639,912. The server 14 can interface with other systems, for example, with in-flight entertainment and/or telephone service systems. In another embodiment the WLAN 10 operates standalone in the mobile platform.

Each access point 18 has an antenna 34 located, for example, in the passenger cabin overhead. Each access point 18 is configured to transmit RF signals to, and receive RF signals from, one or more PEDs 38 carried on board by passengers. Such PEDs are fabricated for wireless use or have a wireless adapter antenna (not shown) and can include laptops, PDAs or the like. The access point antenna 34 may be, for example, an omni-directional or patch antenna. The number and location of access points 18, and the number of PEDs 38 associated with an access point 18, can vary as further described below.

Figure 2:
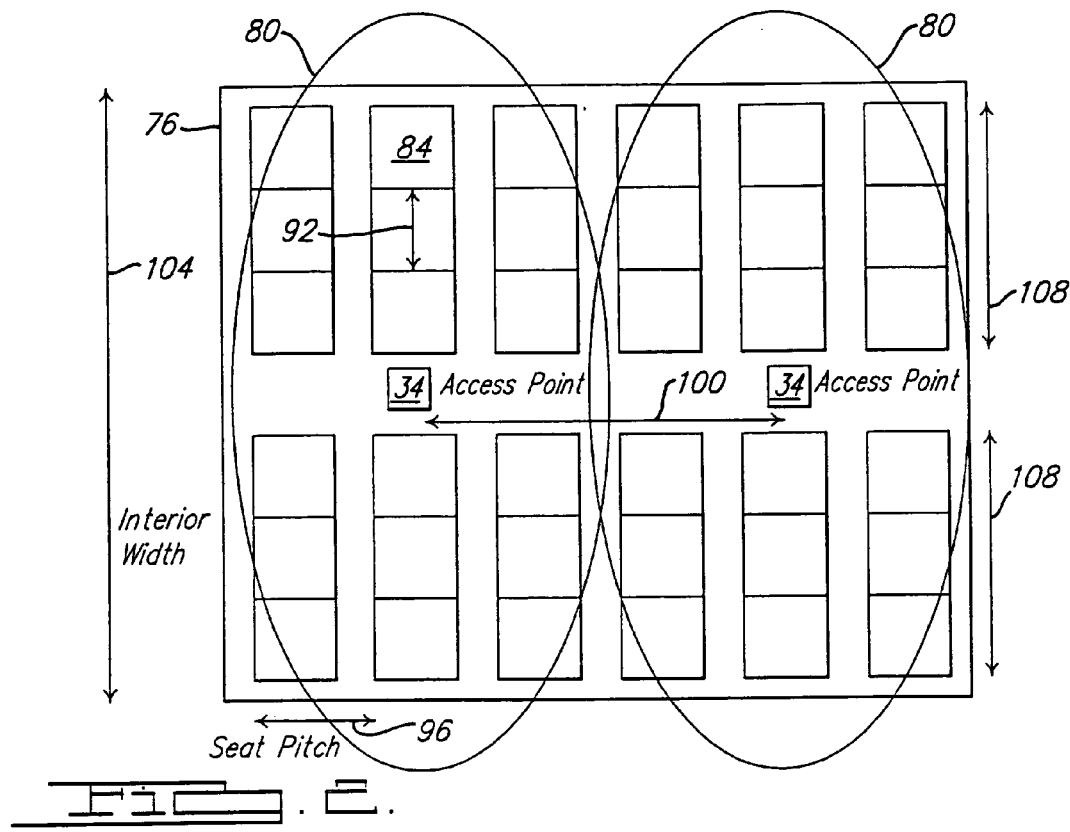
FIG. 2 is a plan view of WLAN cells in an aircraft passenger cabin, shown from above the overhead area.

An exemplary arrangement of access point antennas 34 relative to PEDs 38 is shown in FIG. 2, which is a plan view of a portion 76 of an aircraft passenger cabin. Two access points 18 (not shown in FIG. 2) and associated antennas 34 are located in the overhead. Although an access point 18 could be located outside the cabin overhead, locating it close to its antenna 34 in the overhead reduces the length of a cable connection between them. Each access point 18 broadcasts over a cell 80 that includes eighteen seats 84. Other cell sizes and numbers of associated seats can be used, as further described below. Factors influencing the sizes and numbers of cells 80 include seat width 92, seat pitch 96, distance 100 between antennas 34, interior width 104 of the cabin, and the width 108 of each of the rows of seats 84.

The WLAN 10 operates in the 2.40 to 2.483 GHz ISM band, which is designated for unlicensed commercial or public use. Other licensed or unlicensed bands above 2.4 GHz, for example, the ISM 5.725 to 5.875 GHz band, could also be used. The WLAN 10 is configured in conformance with the IEEE 802.11b (High Rate) standard. The invention is not so limited, and other bands, standards, and protocols can be used. Each access point 18 communicates with the server 14 through the Ethernet switch 22 at full available bandwidth. The WLAN 10 utilizes Direct Sequence Spread Spectrum (DSSS) transmission between each access point 18 and its associated user PEDs 38. That is, the spectrum is divided into three non-overlapping frequency channels of approximately 22 MHz each. It is contemplated that other spread-spectrum modulation methods also could be used.

Each access point 18 is configured to communicate with PEDs 38 over one of the three channels. For example, as shown in FIG. 1, three access points 18 communicate using channels 1, 6 and 11 respectively. Adjacent access points 18 broadcast over different channels. For example, referring to FIG. 2, a user sitting in a cell 80 in which the associated access point 18 broadcasts over channel 1 could communicate with the WLAN 10 via channel 1. Another passenger sitting in an adjacent cell 80 would communicate with the WLAN 10 over channel 6 or channel 11.

Where the number of access points 18 exceeds three, each channel can be re-assigned to another access point 18 that is not adjacent to an access point to which the channel is already assigned. For example, seven access points 18 located sequentially along the aircraft aisle overhead could use channels 1, 6, 11, 1, 6, 11 and 1 respectively. Thus use of each of the three channels can be distributed spatially over the aggregate of cells 80, for example, to users distributed over the entire passenger cabin. Of course, the channels can be distributed over a plurality of cells in many different ways. Additionally, a connected user PED 38 can roam, e.g. as supported by the IEEE 802.11b protocol. That is, a WLAN 10 connection established with a user PED 38 in one cell 80 over one channel can be maintained over another channel if the user PED 38 roams to other cells. For example, a user carrying a PED 38 can walk, from one cell 80 in which the PED is connected to the WLAN 10 via channel 1, into an adjacent cell 80 in which, for example, channel 6 is being used, and maintain the connection to the WLAN 10.

Communication between the PEDs 38 and the access points 18 is half-duplex. That is, in each frequency channel, at any one time either the access point 18 or one user PED 38 can transmit. PEDs communicate via CSMA/CA (Carrier Sense Multiple Access/Collision Avoidance). That is, a PED 38 checks for a quiet channel before transmitting to its associated access point 18. If the channel is busy, the PED waits a random amount of time and then retransmits. Several PEDs 38 could transmit simultaneously when contending for channel use. If a collision of their signals is detected, each of the transmitting PEDs "backs of" and waits a random time period before retransmitting. Eventually one PED gains control of the channel and transmits.

The WLAN 10 is configured such that only access points 18 and PEDs 38 that meet applicable interference, health and safety requirements are allowed to operate within the network. PEDs that do not comply with such standards are excluded from connecting to the WLAN 10. More specifically, and for example, according to IEEE 802.11b protocol, each type of PED 38 that has passed testing for compliance with applicable interference, health and safety standards is identified in the MAC (Media Access Control) layer of the WLAN 10. Thus it can be determined at each access point 18 whether a remote PED 38 has been predetermined to be suitable for connection to the WLAN 10. If the PED is one that has been approved for connection, it is allowed to connect to the network; if not, the PED request for network access is ignored.

Configuring a WLAN for use in aircraft entails consideration of a variety of factors, including those related, for example, to aircraft and passenger safety. Not all of such factors, however, are unique to aircraft. Thus many of the considerations for configuring an aircraft WLAN also pertain to configuring a WLAN for use in other types of mobile platforms. Embodiments of a mobile WLAN as described above can be configured in accordance with the following assumptions, determinations and considerations.

Distance Assumptions and Far Field Calculations

Emissions by 802.11b wireless LANs can be treated as a far field problem. The wavelength, $\lambda$, at 2.4 GHz is 0.125 meters. The far field limit is approximated by $2*d^2/\lambda$ where "d" is the largest dimension of the transmitting antenna. For a typical omni-directional or patch antenna utilized at a wireless access point mounted, for example, in the overhead in an aircraft passenger cabin, the largest dimension is assumed to be approximately 9 inches or 0.23 meters. The far field limit for such an antenna 34, then, is approximately 0.85 meters.

A typical user PED 38 PCMCIA adapter antenna is assumed to have a largest dimension of 2 inches or 0.05 meters. The far field limit for such an antenna, then, is approximately 0.04 meters. Based on the foregoing assumptions and determinations, all WLAN 10 emissions more than one meter from an access point antenna 34 or more than four centimeters from a user PED 38 antenna can be treated as being in the far field.

Non-coaxial aircraft system cables can be lossy at the frequencies contemplated for use in the airborne WLAN 10. Therefore, possible effects of WLAN-radiated field levels at line replaceable units (LRUs) of an aircraft system are considered. An access point antenna 34 transmitting to users in an aircraft passenger compartment would be prevented by its ground plane (not shown) from radiating at significant levels into the overhead compartment. Access point antenna 34 emissions, then, are investigated primarily for their effect on equipment in avionics bays under the floor or in the sidewalls of the aircraft. The user PED 38 antennas could radiate into both the overhead and underfloor areas of the aircraft. System LRUs can be installed in equipment bays and/or in the overhead throughout the aircraft. Therefore the minimum distance from an operating access point antenna 34 or a user PED 38 adapter to an airborne system LRU is assumed to be one meter.

Field Strength Levels

The following methodology is used to evaluate field strength levels for both aircraft system RF susceptibility and for RF exposure compliance. For the following analysis of field strength levels, it is assumed that a transmit antenna on either an access point or user adapter has a maximum gain value of 2.2 dBi (numerical value 1.66), and that transmit cable losses are zero dB. The far field radiated power density is given by:

$$P_d = (P_t * G)/(4 * \pi * D^2) \quad (1)$$

where "$P_t$" is transmitter power at antenna input in watts, "G" is numerical gain of the transmit antenna relative to an isotropic source, and "D" is distance from center of transmit antenna to measuring point in meters.

Figure 3:
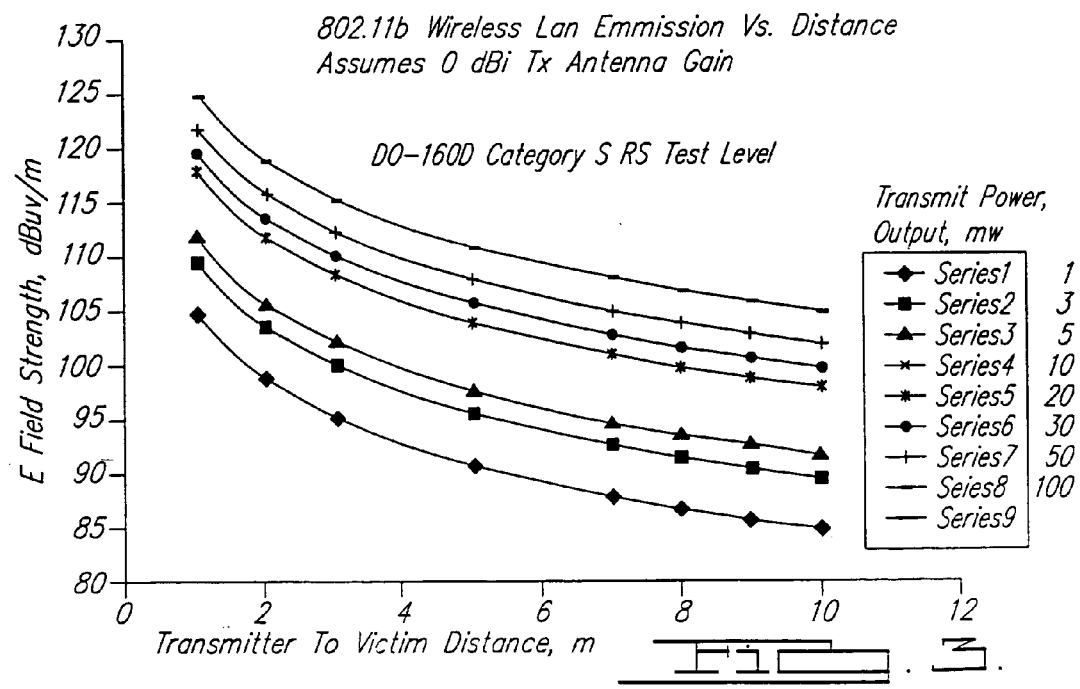
FIG. 3 is a graph of E-field strength of emissions versus transmitter-to-victim distance for a WLAN.

The E-field in free space is given by:

$$E(v/m) = \text{SQRT} (P_d * 377), \text{ or} \quad (2)$$

$$E(dBuv/m) = 20 \text{ LOG}_{10}(E * 10^6) \quad (3)$$

where "E"

Where "E" is the E-field strength in volts per meter and "dBuv/m" is field strength in dB above 1 microvolt per meter. Referring to FIG. 3, test data indicate that, for a single transmitter, transmitted power levels of both 1 and 3 milliwatts with a nominal unity gain (0 dBi) transmit antenna, the field strength is at or below 110 dBuv/m (0.3 volts per meter) for all distances greater than one meter. For multiple transmitters operating simultaneously using 802.11b protocol, field strength levels are analyzed as further described below.

Maximum Permissible Exposure (MPE) Levels

A 802.11b network operates in the 2.4 to 2.483 GHz ISM band. The IEEE C.95.1-1999 standard for human exposure to RF electromagnetic fields specifies a maximum permissible whole body exposure (MPE) level for this frequency region in an uncontrolled environment of f/1500 mw/cm2 averaged over 30 minutes, where f is frequency expressed in MHz. The worst case or minimum value is at the lower end of the frequency band where MPE=2400/1500=1.6 mw/cm2 or 16 w/m2. The FCC requirement as specified in OET Bulletin 65 for this frequency range is 1.0 mw/cm2 or 10 w/m2 averaged over 30 minutes. Although the European CENELEC ES59005 maximum allowable RF exposure levels are less stringent than the FCC limits, the more conservative FCC requirements for compliance are used herein.

Maximum 802.11b Radiated Field Strengths

It is assumed that over any 30-minute interval the separation distance from an individual to an access point antenna 34 in the overhead is 1.0 meters. Table 1 below describes 2.4 GHz WLAN radiated emissions at transmit powers from 1 to 100 milliwatts and at a transmitter-to-victim distance of 1 meter.

TABLE 1

2.4 GHz WLAN Radiated Emissions

Victim to Transmitter Distance = 1 m        lambda = 0.125 m
Assume Tx antenna gain (dBi) = 2.2 = numeric   Eff Area = 0.001875 m^2
1.659587                                       short dipole

| Transmit Power (mw) | Tx Power Density w/m^2 | Tx Field Strength v/m | Tx Field Strength dBuv/m | Received Power w | Received Power dBm |
|---|---|---|---|---|---|
| 1 | 0.000132066 | 0.223134 | 106.9713 | 2.48E-07 | -36.06209 |
| 3 | 0.000396197 | 0.386479 | 111.7425 | 7.43E-07 | -31.29087 |
| 5 | 0.000660329 | 0.498943 | 113.961 | 1.24E-06 | -29.07239 |
| 10 | 0.001320657 | 0.705612 | 116.9713 | 2.48E-06 | -26.06209 |
| 20 | 0.002641315 | 0.997886 | 119.9816 | 4.95E-06 | -23.05179 |
| 30 | 0.003961972 | 1.222155 | 121.7425 | 7.43E-06 | -21.29087 |
| 50 | 0.006603286 | 1.577796 | 123.961 | 1.24E-05 | -19.07239 |
| 100 | 0.013206573 | 2.23134 | 126.9713 | 2.48E-05 | -16.06209 |

Referring to Table 1, test data indicate that an 802.11b system radiating at 3 mw maximum output power will generate a radiated power density of 4×10−4 w/m2 at the distance of 1 meter from the access point antenna 34. This power density is 4.0×10−5 times the maximum allowed FCC level, which is equal to a margin of 44 dB.

It is possible for tall individuals to be within 0.25 meters of an overhead access point antenna 34 in a single-aisle aircraft or for a user to be within 0.05 meters of his/her PED 38 antenna. Table 2 below describes 2.4 GHz WLAN radiated emissions at transmit powers from 1 to 100 milliwatts and at a transmitter-to-victim distance of 0.05 meter.

TABLE 2

2.4 GHz WLAN Radiated Emissions

Victim to Transmitter Distance = 0.05 m      lambda = 0.125 m
Assume Tx antenna gain (dBi) = 2.2 = numeric   Eff Area = 0.001875 m^2
1.659587                                       short dipole

| Transmit Power (mw) | Tx Power Density w/m^2 | Tx Field Strength v/m | Tx Field Strength dBuv/m | Received Power w | Received Power dBm |
|---|---|---|---|---|---|
| 1 | 0.052826292 | 4.46268 | 132.9919 | 9.9E-05 | -10.0415 |
| 3 | 0.158478876 | 7.729588 | 137.7631 | 0.000297 | -5.27027 |
| 5 | 0.26413146 | 9.978856 | 139.9816 | 0.000495 | -3.05179 |
| 10 | 0.52826292 | 14.11223 | 142.9919 | 0.00099 | -0.04149 |
| 20 | 1.056525839 | 19.95771 | 146.0022 | 0.001981 | 2.968814 |
| 30 | 1.584788759 | 24.4431 | 147.7631 | 0.002971 | 4.729727 |
| 50 | 2.641314598 | 31.55591 | 149.9816 | 0.004952 | 6.948214 |
| 100 | 5.282629196 | 44.6268 | 152.9919 | 0.009905 | 9.958514 |

Table 3 below describes margins of compliance with FCC OET Bulletin 65 for worst-case exposure with access points separated by 3 meters and with multiple transmitters.

TABLE 3

Worst Case Exposure with Multiple Transmitters
Compliance Margins for FCC OET Bulletin 65 Reqmt Seat spacing (row) = 0.8 m    in = 31.496  Self Dist = 0.05 m
Seat spacing (side) = 0.5 m   in = 19.685  FCC Rqmt 10 w/m²
                                           Access Pt
Spacing = 3 m
Assume Tx antenna gain (dBi) = 2.2 = numeric 1.659587

| Single Emitter Tx Pwr = 3 Distance m | Pwr Dens w/m² |
|---|---|
| 0.75 | 0.000704 |
| 0.7 | 0.000809 |
| 0.6 | 0.001101 |
| 0.5 | 0.001585 |
| 0.4 | 0.002476 |
| 0.3 | 0.004402 |
| 0.25 | 0.006339 |
| 0.2 | 0.009905 |
| 0.1 | 0.03962 |
| 0.05 | 0.158479 |

Two & Four Adjacent Emitters + Own @ 0.05 meter
Tx Pwr = 3 mw

| Four + own Dist-TX#1 Margin m | Dist-TX#2 m | Two + own w/m² | Two + own Margin dB | Single Margin dB | Four + own w/m² | dB |
|---|---|---|---|---|---|---|
| 0.25 | 0.75 | 0.165522 | 17.81143 | 41.52211 | 0.166931 | 17.77463 |
| 0.3 | 0.7 | 0.16369 | 17.85979 | 40.92285 | 0.165098 | 17.82257 |
| 0.4 | 0.6 | 0.162056 | 17.90336 | 39.58391 | 0.163464 | 17.86577 |
| 0.5 | 0.5 | 0.161648 | 17.91428 | 38.00029 | 0.163057 | 17.8766 |
| 0.6 | 0.4 | 0.162056 | 17.90336 | 36.06209 | 0.163464 | 17.86577 |
| 0.7 | 0.3 | 0.16369 | 17.85979 | 33.56331 | 0.165098 | 17.82257 |
| 0.75 | 0.25 | 0.165522 | 17.81143 | 31.97969 | 0.166931 | 17.77463 |
| 0.8 | 0.2 | | | 30.04149 | | |
| 0.9 | 0.1 | | | 24.02089 | | |
| 0.95 | 0.05 | | | 18.00029 | | |

Exposure from Two Adjacent Access Pts
Tx Pwr = 3 mw

| Dist-TX#1 m | Dist-TX#2 m | PwrDens w/m² | Margin dB |
|---|---|---|---|
| 0.25 | 2.75 | 0.006392 | 31.94394 |
| 0.3 | 2.7 | 0.004457 | 33.51002 |
| 0.4 | 2.6 | 0.002535 | 35.96049 |
| 0.5 | 2.5 | 0.001648 | 37.82995 |
| 0.6 | 2.4 | 0.001169 | 39.32062 |
| 0.7 | 2.3 | 0.000883 | 40.53813 |
| 0.8 | 2.2 | 0.000701 | 41.54333 |
| 0.9 | 2.1 | 0.000579 | 42.37342 |
| 1 | 2 | 0.000495 | 43.05179 |
| 1.1 | 1.9 | 0.000437 | 43.59334 |
| 1.2 | 1.8 | 0.000397 | 44.0075 |
| 1.3 | 1.7 | 0.000372 | 44.30008 |
| 1.4 | 1.6 | 0.000357 | 44.47446 |
| 1.5 | 1.5 | 0.000352 | 44.53241 |

Referring to Tables 2 and 3, test data indicate that an 802.11b system radiating at 3 mw maximum output power will generate a radiated power density of 6.3×10−3 w/m2 at the worst-case minimum distance of 0.25 meters from the access point antenna 34 and 1.6×10−1 w/m2 at the worst-case minimum distance of 0.05 meters from the user PED 38 antenna. For the access point antenna 34, this power density is 6.3×10−4 of the maximum allowed FCC level, which is equal to a margin of 32 dB. For the user PED 38 antenna, this is 1.6×10—2 of the maximum allowed FCC level, which is equal to a margin of 18 dB.

Contribution from Multiple WLAN Sources

The contribution of multiple WLAN RF emission sources simultaneously transmitting is addressed next. Referring to FIG. 2, the width 92 of each seat 84 is assumed to be 0.5 meters. The seat pitch 96 is assumed to be 0.8 meters (32 inches) and the distance 100 between access point antennas 34 is assumed to be a minimum of 2.5 to 3 meters. Thus it is assumed that the worst-case RF levels are generated by multiple users transmitting via PEDs 38 while sitting in the seats 84 or otherwise closely spaced in the cell areas 80. It is assumed that the user PEDs 38 transmit simultaneously when they contend for the RF medium as previously described. Such simultaneous transmissions occur only for short periods of time (before one PED is granted access to transmit), compared to the 30-minute exposure time described above in connection with the FCC maximum allowed level of power density. The possibility nevertheless is considered, however, that such transmissions might generate RF signal levels that might interfere with airframe systems. It also is assumed that these asynchronous sources are in phase and that their transmitted signals will add constructively, even though this is unlikely.

Figure 4:
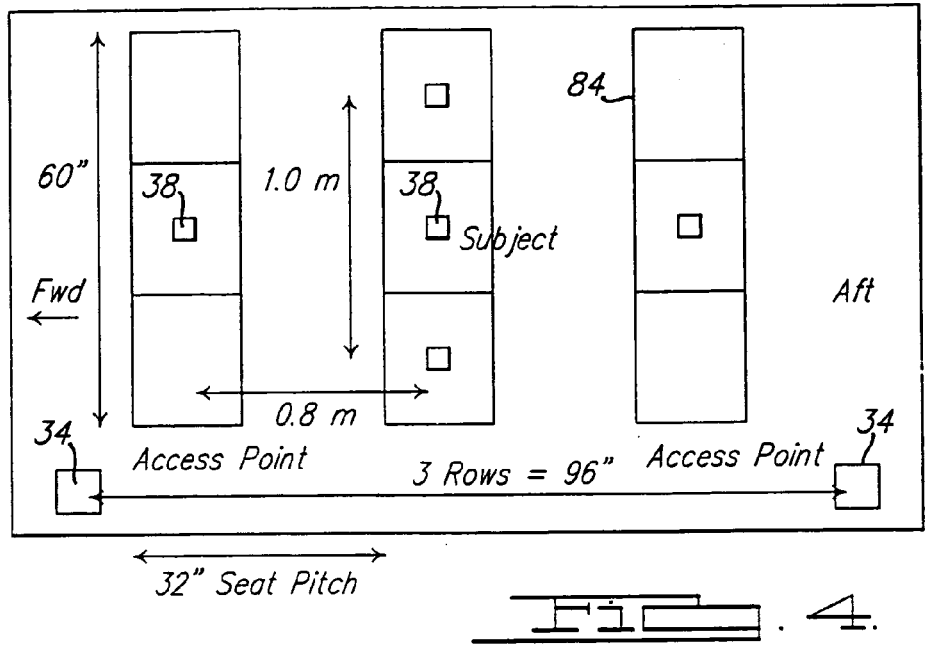
FIG. 4 is a view of a portion of a passenger cabin, shown from above the overhead area, in which more than one user PED is in use.
Figure 5:
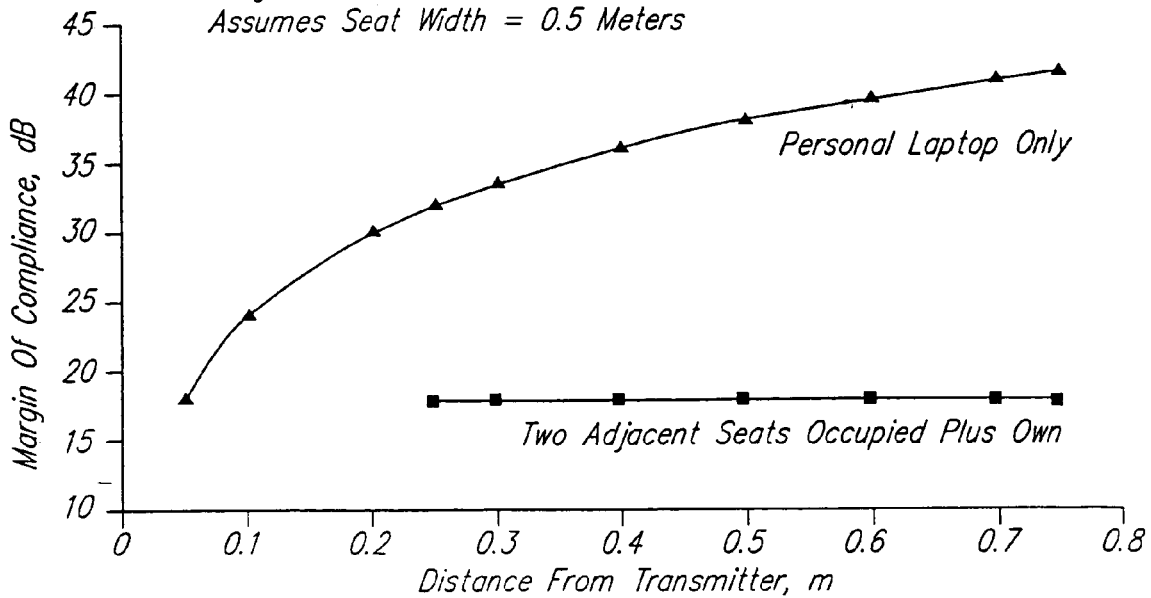
FIG. 5 is a graph of margins of compliance with FCC OET Bulletin 65 for the effect of adjacent laptops on RF exposure versus distance from transmitter.

A layout of a plurality of PEDs 38 in adjacent seats 84 is shown in FIG. 4. The predominant source of EMI is likely to be a user's own laptop 38 antenna, which was assumed above to be at the worst-case distance of 0.05 meters from the user. FIG. 5 shows margins of compliance to FCC emission requirements for a single laptop and for a laptop adjacent to other laptops. At the assumed seat width of 0.5 meters, the effect of one adjacent emissions source diminishes as the user approaches (e.g. leans toward) the other source. The seat pitch is assumed to be 0.8 meters (32 inches). Therefore the contributions from sources in seat rows in front of or behind the subject will not significantly affect the margin of compliance. As shown in Table 3, including two more sources at 0.75 meters (directly in front and in back of the subject laptop and transmitting at 3 mw) to the two sources in the same seat group plus the subject's laptop will only change the margin for RF exposure compliance from 17.81 to 17.77 dB.

Radiated Cell Dimensions

Cell size is determined based on the contemplated power level for the WLAN, the aggregate bandwidth contemplated to be available, and the number of users contemplated to share the bandwidth. For example, in the embodiment shown in FIG. 2, a cell population of 3 rows includes 18 seats per access point. Such could be the case for a narrow body aircraft, e.g. a Boeing 737 or 757. A cell population of three rows on a wide body, e.g. a Boeing 767 or 200, could include 21 seats. A worst-case demand for bandwidth is likely to be for users requesting streaming video services. While systems using 802.11b protocol have been demonstrated to provide up to 8 Mbps per access point, a bandwidth of 6 Mbps is assumed to be achievable on a repeatable basis using standard hardware components. Thus it is assumed that a maximum aggregate bandwidth of 6 Mbps is available per access point 18 using short transmission preambles, and that typically 30 percent, i.e. 6 or 7 user PEDs 38, in a cell 80 are active and sharing the 6 Mbps bandwidth. Less bandwidth-demanding services such as e-mail or Internet access can support more users per access point 18. It is contemplated that power radiated by components of the WLAN 10 is kept in the 1- to 5-mw range in order to meet interference, health and safety requirements.

Received Signal Strength

Table 4 below describes 2.4 GHz WLAN radiated emissions at transmit powers from 1 to 100 milliwatts and at a transmitter-to-victim distance of 3 meters. Assuming a maximum distance of 3 meters between an access point and its cell boundary, as shown in Table 4, a user PED 38 at the maximum distance from an access point antenna 34 broadcasting at 1 milliwatt receives a signal in the range of −45 to −50 dBm. This signal exceeds the 802.11b-specified value of −76 dBm required to support 11 Mbps communication. Such margin protects against signal fading due to mulltipath within the aircraft cabin.

TABLE 4

2.4 GHz WLAN Radiated Emissions

Victim to Transmitter Distance = 3 m  lambda = 0.125 m
Assume Tx antenna gain (dBi) = 2.2 = numeric  Eff Area = 0.001875 m^2
1.659587  short dipole

| Transmit Power (mw) | Tx Power Density w/m^2 | Tx Field Strength v/m | Tx Field Strength dBuv/m | Received Power w | Received Power dBm |
|---|---|---|---|---|---|
| 1   | 1.4674E−05  | 0.074378 | 97.42889  | 2.75E−08 | −45.60451 |
| 3   | 4.40219E−05 | 0.128826 | 102.2001  | 8.25E−08 | −40.8333  |
| 5   | 7.33698E−05 | 0.166314 | 104.4186  | 1.38E−07 | −38.61481 |
| 10  | 0.00014674  | 0.235204 | 107.4289  | 2.75E−07 | −35.60451 |
| 20  | 0.000293479 | 0.332629 | 110.4392  | 5.5E−07  | −32.59421 |
| 30  | 0.000440219 | 0.407385 | 112.2001  | 8.25E−07 | −30.8333  |
| 50  | 0.000733698 | 0.525932 | 114.4186  | 1.38E−06 | −28.61481 |
| 100 | 0.001467397 | 0.74378  | 117.4289  | 2.75E−06 | −25.60451 |

RF Susceptibility Test Levels For Aircraft Equipment

Aircraft systems have been qualified to varying RF susceptibility test levels and frequency ranges. Those systems that have been determined to be flight-critical and essential are required to demonstrate immunity to the effects of High Intensity Radiated Fields (HIRF) and have been tested to field strengths that are many orders of magnitude above the RF field strength generated by an 802.11b WLAN system. Other systems qualified to levels below the HIRF levels also have demonstrated RF immunity in the 2.4 to 2.483 GHz frequency range. For any aircraft system for which there is no radiated susceptibility test data in the 802.11b operating band of 2.4 to 2.483 GHz, it is proposed that aircraft level susceptibility testing be performed to demonstrate that there will be no interference from the worst case operation of an 802.11b wireless LAN configured in accordance with the embodiments described herein.

The above-described WLAN 10 includes multiple intentional RF transmitters that operate at very low levels of RF field strength. These low levels provide significant margins of compliance for both electromagnetic interference and RF exposure limit regulations for operators, airframe manufacturers, and the traveling public. This makes it possible to safely operate the above-described WLAN 10 on board commercial aircraft in flight.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wireless local area network adapted for use by users traveling on a mobile platform, wherein the mobile platform has a plurality of rows of seats, the network comprising:
   a network server located on the mobile platform;
   a plurality of network access components each independently associated with a specified seating area on the mobile platform, each being in communication with the network server, and each network access component being accessible wirelessly by a predetermined number of portable electronic devices;
   each of said network access components including an antenna;
   at least first and second ones of the network access components further being located at spaced apart ones of said seat rows in the mobile platform; and each of the network access components further being configured to wirelessly communicate via its associated said antenna with said portable electronic devices within an associated one of said seating areas on the mobile platform while enabling roaming of a given one of said portable electronic devices between said first and second ones of the network access components; and a communication system for wirelessly linking said network server on said mobile platform with a subsystem disposed remotely from said mobile platform.

2. The wireless local area network of claim 1, wherein the network access components are each operably associated with at least one spaced apart seat row.

3. The wireless local area network of claim 1, wherein adjacently positioned ones of said network access points operate on non-overlapping frequency channels.

4. The wireless local area network of claim 1, wherein each of the network access components is configured to transmit and receive signals using a spread-spectrum modulation method.

5. The wireless local area network of claim 1, wherein each of the network access components is configured to provide a wireless communications link to only ones of said portable electronic devices that meet a predetermined standard for electromagnetic interference.

6. The wireless local area network of claim 1, wherein each of the network access components is configured to provide a wireless communications link to only ones of said portable electronic devices that meet a predetermined standard for at least one of health and safety.

7. A wireless local area network adapted for use by users traveling on a mobile platform, wherein the mobile platform has a plurality of rows of seats, the network comprising:

a network server located on the mobile platform;

a plurality of network access components each forming a network access point, and each being independently associated with a different, predetermined seating row on the mobile platform, and each being in communication with the network server;

each said network access component being accessible wirelessly by at least one portable electronic device located in its associated said seating row;

each of said network access components including an antenna;

each of the network access components further being configured to wirelessly communicate via its associated said antenna with said portable electronic devices within an associated one of said seating rows on the mobile platform while enabling roaming of a given one of said electronic devices between said different ones of said network access components; and a communication system for wirelessly communicating information between said network server on said mobile platform and a subsystem disposed remotely from said mobile platform, said communication system including a receive antenna and a transmit antenna.

8. The wireless local area network of claim 7, wherein each said network access component provides wireless coverage for ones of said personal electronic devices that are located in a plurality of rows of said seats.

9. The wireless local area network of claim 7, wherein each said network access component is located overhead in a cabin area of the mobile platform.

10. The wireless local area network of claim 7, wherein each said network access component provides a wireless coverage region for covering all of the seats in a given row of said seats within the mobile platform.

11. The wireless local area network of claim 7, wherein adjacently positioned ones of said network access points operate on non-overlapping frequency channels.

12. The wireless local area network of claim 7, wherein each of the network access components is configured to transmit and receive signals using a spread-spectrum modulation method.

13. The wireless local area network of claim 7, wherein each of the network access components is provides a wireless communications link to only ones of said portable electronic devices that meet a predetermined standard for electromagnetic interference.

14. A wireless local area network adapted for use by users traveling on a mobile platform, wherein the mobile platform has a plurality of rows of seats, the network comprising:

a network server located on the mobile platform;

a plurality of network access components each forming a network access point, and each being independently associated with a different, predetermined group of seating rows on the mobile platform, and each being in communication with the network server;

each said network access component being accessible wirelessly by at least one portable electronic device located within its associated said group of seating rows;

each of said network access components including an antenna located in an overhead area of a cabin of said mobile in which said rows of seats are located;

each of the network access components further enabling roaming of a given one of said electronic devices between said different ones of said network access components; and a communication system for wirelessly communicating information between said network server on said mobile platform and a subsystem disposed remotely from said mobile platform, said communication system including a receive antenna and a transmit antenna.

15. The wireless network of claim 14, wherein each of the network access components transmits and receives signals using a spread-spectrum modulation method.

16. The wireless network of claim 14, wherein each of the network access components is located in an overhead area within a cabin area in which said seat rows are located.

17. The wireless network of claim 14, wherein adjacent ones of each of the network access components operate on non-overlapping frequency channels.

18. The wireless network of claim 14, wherein each said network access point is configured to operate with a predetermined maximum number of said personal electronic devices at any given time.

* * * * *